United States Patent
Brandl et al.

(10) Patent No.: US 11,208,513 B2
(45) Date of Patent: Dec. 28, 2021

(54) PROCESS FOR PRODUCING POLYETHYLENE POLYMERS

(71) Applicant: ExxonMobil Chemical Patents Inc., Baytown, TX (US)

(72) Inventors: Corrine L. Brandl, Beaumont, TX (US); William A. Lamberti, Stewartsville, NJ (US); Charles R. Buhler, Merritt Island, FL (US); Judson S. Clements, Boone, NC (US); Harry W. Deckman, Clinton, NJ (US); Joseph Moebus, Houston, TX (US); Marc L. DeChellis, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 196 days.

(21) Appl. No.: 16/491,865

(22) PCT Filed: Feb. 7, 2018

(86) PCT No.: PCT/US2018/017195
§ 371 (c)(1),
(2) Date: Sep. 6, 2019

(87) PCT Pub. No.: WO2018/164798
PCT Pub. Date: Sep. 13, 2018

(65) Prior Publication Data
US 2020/0291149 A1    Sep. 17, 2020

Related U.S. Application Data

(60) Provisional application No. 62/469,159, filed on Mar. 9, 2017.

(51) Int. Cl.
*C08F 210/16*    (2006.01)
*C08F 4/02*    (2006.01)
(Continued)

(52) U.S. Cl.
CPC .............. *C08F 210/16* (2013.01); *C08F 2/34* (2013.01); *C08F 4/65916* (2013.01);
(Continued)

(58) Field of Classification Search
None
See application file for complete search history.

(56) References Cited

U.S. PATENT DOCUMENTS 4,803,251 A    2/1989    Goode et al.
5,037,905 A    8/1991    Cummings et al.
(Continued)

FOREIGN PATENT DOCUMENTS

EP    0313087    5/1991

*Primary Examiner* — Richard A Huhn
(74) *Attorney, Agent, or Firm* — ExxonMobil Chemical Patents Inc.—Law Department

(57) ABSTRACT

A process for producing polyethylene polymers including contacting ethylene and at least one $C_3$ to $C_8$ alpha-olefin comonomer with a polymerization catalyst on a particulate support in a fluidized bed polymerization reactor under conditions effective to polymerize at least part of the ethylene and comonomer and produce the polyethylene polymers, wherein the support has a $d_{10}$ particle size as measured by laser diffraction of at least 18 microns, is provided.

13 Claims, 2 Drawing Sheets

(51) Int. Cl.
    *C08F 2/00*       (2006.01)
    *B01J 31/16*     (2006.01)
    *B01J 35/00*     (2006.01)
    *C08F 2/34*       (2006.01)
    *C08F 4/659*     (2006.01)
    *C08F 210/06*    (2006.01)
    *C08F 210/08*    (2006.01)
    *C08F 210/14*    (2006.01)

(52) U.S. Cl.
    CPC .......... *C08F 210/06* (2013.01); *C08F 210/08* (2013.01); *C08F 210/14* (2013.01); *B01J 31/1616* (2013.01); *B01J 35/00* (2013.01); *C08F 2/002* (2013.01); *C08F 4/025* (2013.01); *C08F 2420/00* (2013.01)

(56) References Cited

U.S. PATENT DOCUMENTS

| | | |
|---|---|---|
| 5,066,736 A | 11/1991 | Dumain et al. |
| 5,200,502 A | 4/1993 | Kao et al. |
| 5,244,987 A | 9/1993 | Bernard et al. |
| 5,264,506 A * | 11/1993 | Eisinger ............... C08F 210/18 526/194 |
| 5,391,657 A | 2/1995 | Song et al. |
| 5,733,988 A | 3/1998 | Apecetche et al. |
| 5,969,061 A | 10/1999 | Wonders et al. |
| 6,011,128 A | 1/2000 | Eisinger et al. |
| 6,455,660 B1 | 9/2002 | Clutton et al. |
| 7,910,668 B2 | 3/2011 | Muhle et al. |
| 2009/0306299 A1* | 12/2009 | Kipke ................... C08F 10/00 525/240 |

\* cited by examiner

PROCESS FOR PRODUCING POLYETHYLENE POLYMERS

CROSS-REFERENCE OF RELATED APPLICATIONS

This application is a National Phase Application claiming priority to PCT Application Serial No. PCT/US2018/017195, filed Feb. 7, 2018, which claims the benefit of U.S. Provisional Application No. 62/469,159, filed Mar. 9, 2017, the disclosures of which are hereby incorporated by reference in their entirety.

FIELD OF THE INVENTION

This invention relates to the production of polyethylene polymers in a gas phase polymerization process.

BACKGROUND OF THE INVENTION

In the gas phase process for the production of polyolefin polymers, such as polyethylene polymers, a gaseous alkene (e.g., ethylene), hydrogen, co-monomer (e.g., 1-hexene) and other raw materials are converted to solid polyolefin product. Generally, gas phase reactors include a fluidized bed reactor, a compressor, and a cooler (heat exchanger). The reaction is maintained in a two-phase fluidized bed of granular polyethylene polymers and gaseous reactants by a fluidizing gas which is passed through a distributor plate near the bottom of the reactor vessel. Catalyst is injected into the fluidized bed, while heat of reaction is transferred to the circulating gas stream. This gas stream is compressed and cooled in an external recycle line and then is reintroduced into the bottom of the reactor where it passes through the distributor plate. Make-up feedstreams are added to maintain the desired reactant concentrations.

Operation of most reactor systems is critically dependent upon good mixing for uniform reactor conditions, heat removal, and effective catalyst performance. The process must be controllable and capable of a high production rate. In general, the higher the operating temperature, the greater the capability to achieve high production rate. Because polymerization reactions are typically exothermic, heat transfer out of the reactor is critical to avoid such problems as particle agglomeration and runaway reactions. However, as the operating temperature approaches and exceeds the melting point of the polyolefin product, the particles of polyolefin become tacky and melt. For example, non-uniform fluidization of the bed can create "hot spots," which in turn can cause the newly-formed polymer particles to become tacky due to elevated temperatures in the hot spots.

An interplay of forces may result in particles agglomerating with adjacent particles, and may lead to "sheeting" and other forms of reactor fouling. In agglomeration, the particles stick together, forming agglomerated particles that affect fluid flow and may be difficult to remove from the system. In sheeting, tacky particles gather on a surface of the reactor system, such as the wall of the reactor vessel, forming a sheet of polymer particles. Progressive cycles in this process may eventually result in the growth of the sheet and its falling into the fluid bed. These sheets can interrupt fluidization, circulation of gas and withdrawal of the product from the reactor, and may require a reactor shutdown for removal.

Many factors influence the propensity for sheeting and other fouling phenomena, of which one is the type of catalyst. For example, metallocene catalysts allow the production of polyolefins with unique properties such as narrow molecular weight distributions and narrow chemical compositions. These properties in turn result in improved structural performance in products made with these polymers, such as greater impact strength and clarity in films. However, while metallocene catalysts have yielded polymers with improved characteristics, they have presented particular challenges when used in fluidized bed reactors, in particular, in relation to sheeting and fouling in other portions of the reactor system, such as the distributor plate and the cooler.

Various methods for controlling sheeting have been developed. These methods often involve monitoring the static charges near the reactor wall in regions where sheeting is known to develop and introducing a static control agent into the reactor when the static levels fall outside a predetermined range. For example, U.S. Pat. Nos. 4,803,251 and 5,391,657 disclose the use of various chemical additives in a fluidized bed reactor to control static charges in the reactor. A positive charge generating additive is used if the static charge is negative, and a negative charge generating additive is used if the static charge is positive. The static charge in the reactor is typically measured at or near the reactor wall at or below the site where sheet formation usually occurs, using static voltage indicators such as voltage or current probes or electrodes. However, these approaches not only add to the cost of the process but also to complexity of process control.

Other approaches rely on addition of continuity additives to minimize agglomeration and sheeting. One disadvantage in using continuity additives or antistatic agents is the increased cost they add to the polymerization reaction. Another disadvantage in using continuity additives or antistatic agents is the gas phase reactor may require additional equipment to feed and monitor the level of these additives. In addition, certain continuity aids may effectively act as mild catalyst poisons and so would lead to increased catalyst usage and cost. It is therefore desirable to obviate or reduce the need for continuity aids.

Another factor that has been shown to result in reactor fouling in gas phase fluidized bed processes for producing polyethylene polymers is the accumulation of polymer fines (defined as polymer particles having a particle size less than 125 microns) in the reactor system. This problem is discussed in, for example, U.S. Pat. No. 5,969,061, where the proposed solution is to add an inert $C_3$-$C_8$ hydrocarbon to the fluidizing gas mixture in a controlled amount dependent on the measured level of fines in the reactor. The stated goal is to reduce the amount of fines produced in the reactor without having to modify the catalyst. This solution relies upon resin particle softening, through changes in gas composition and adsorption, to promote agglomeration of fines to larger particles, and to reduce fines formation via reduced fracture of larger particles. The proposed increased adsorption and particle softening also result in deleterious operational effects, namely melting point depression and increased resin stickiness, which promote increased resin sheeting (see, for example, U.S. Pat. No. 7,910,668). Moreover, this solution increases the complexity of the process monitoring system as well as the overall polymer cost.

Therefore, there is a need for improved processes for producing polyethylene polymers in gas phase fluidized bed reactors that reduce the probability of sheeting and/or agglomeration in the reactor system, and/or reduce or eliminate the need for continuity additives, gas composition changes, and/or antistatic agents.

SUMMARY OF THE INVENTION

According to embodiments of the invention, it has now been found that the problem of sheeting and/or other reactor fouling in gas phase polymerization processes can be significantly reduced by particular selection of the particle size distribution of the support for the polymerization catalyst.

Thus, in a class of embodiments, the invention provides for a process for producing polyethylene polymers comprising contacting ethylene and at least one $C_3$ to $C_8$ alpha-olefin comonomer with a catalyst on a particulate support in a fluidized bed polymerization reactor under conditions effective to polymerize at least part of the ethylene and comonomer, producing and recovering the polyethylene polymers, wherein the particulate support has a $d_{10}$ particle size as measured by laser diffraction of at least 18 microns.

In another class of embodiments, the invention provides for a process for reducing sheeting during polymerization of ethylene and 1-hexene in a fluidized bed reactor to produce a polyethylene product with a gradient density of at least 0.940 g/cc using one or more metallocene catalysts supported on particulate silica with a $d_{10}$ particle size as measured by laser diffraction of at least 18 microns.

In yet another class of embodiments, the invention provides for a process for reducing plate fouling at constant superficial gas velocity during polymerization of ethylene and 1-hexene in a fluidized bed reactor to produce a polyethylene product with a gradient density less than 0.940 g/cc using a metallocene catalyst supported on particulate silica with a $d_{10}$ particle size as measured by laser diffraction of at least 18 microns.

In still yet another class of embodiments, the invention provides a process for the polymerization of ethylene and 1-hexene in a fluidized bed reactor to produce a polyethylene product with a gradient density less than 0.940 g/cc using a metallocene catalyst supported on particulate silica with a $d_{10}$ particle size as measured by laser diffraction of at least 18 microns, wherein reactor cooling and polymer production rate are increased at constant plate fouling rate by increasing superficial gas velocity.

DETAILED DESCRIPTION OF THE INVENTION

Figure 1:
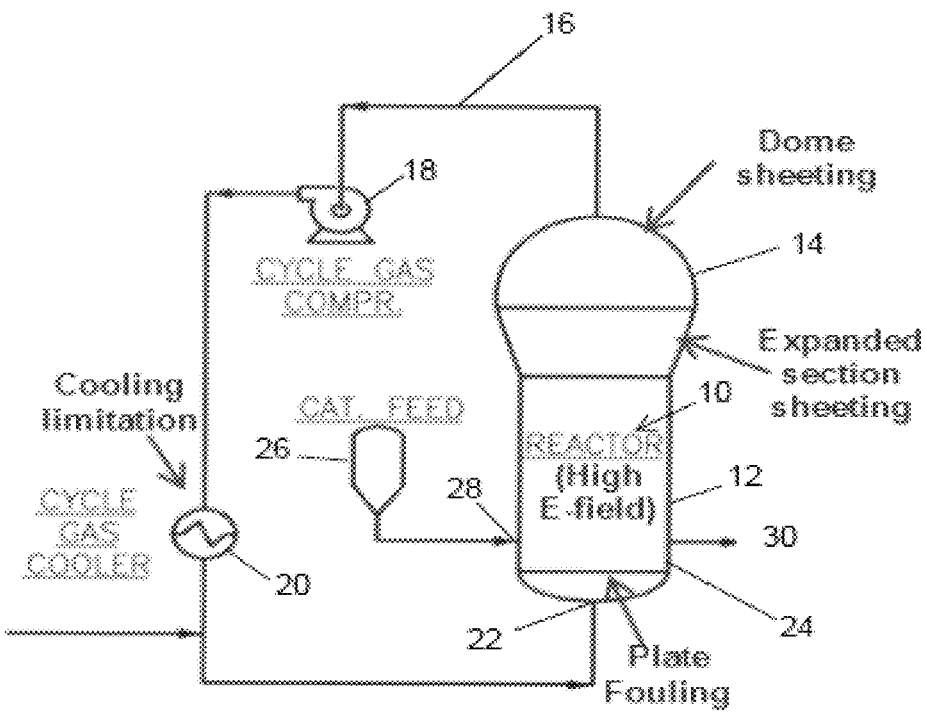
FIG. 1 is a flow diagram of a gas phase fluidized bed reaction system useful for the production of polyethylene polymers.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

Described herein is a process for producing polyethylene polymers in which ethylene and at least one $C_3$ to $C_8$ alpha-olefin comonomer, preferably 1-hexene, are contacted with a polymerization catalyst on a particulate support in a fluidized bed polymerization reactor under conditions effective to polymerize at least part of the ethylene and comonomer and produce a polyethylene product. In accordance with the present invention, the particulate support is specifically selected so as to have a $d_{10}$ particle size as measured by laser diffraction of at least 18 microns, preferably at least 20 microns, more preferably at least 21 microns. By controlling the $d_{10}$ particle size of the support, it is found that the production of polymer fines (polymer particles having a particle size less than 125 microns) during the polymerization process can be significantly reduced. This is an important advantage since small polymer particles in the fluidized reactor bed are more likely to be entrained by recycle gas and carried over into the recycle gas piping. The particles may then adhere to various components of the reactor system, such as the reactor walls, the recycle gas cooler and the distributor plate, resulting in fouling and an eventual need to shut down and clean out the system. Entrainment thus limits the superficial gas velocity (SGV) at which a reactor can operate. In contrast, being able to run at a higher SGV is desirable because it increases the rate of cooling in the cycle gas cooler, allowing the exothermic polymerization reaction to occur at a higher production rate.

In addition to having a $d_{10}$ particle size of at least 18 microns, the particulate support used in the present process may have $d_{50}$ particle size as measured by laser diffraction of at least 40 microns, such as at least 45 microns, and a $d_{90}$ particle size as measured by laser diffraction of no more than 100 microns, such as no more than 95 microns. In this respect, all support and polymer particle sizes referred to herein are as measured on a Malvern Mastersizer 2000. As used herein, the term $d_x$, for example where x is 10, 50 or 90, means that x % by weight of the relevant particulate material has a particle size below the cited $d_x$ value and (100-x) % by weight has a particle size above the cited $d_x$ value.

Any particulate material inert to reagents and conditions used in the polymerization process can be used as the support. Preferably, the support material is an inorganic oxide. Suitable inorganic oxide materials include Groups 2, 4, 13, and 14 metal oxides, such as silica, alumina, and mixtures thereof. As used herein, all reference to the Periodic Table of the Elements and groups thereof is to the NEW NOTATION published in HAWLEY's CONDENSED CHEMICAL DICTIONARY, Thirteenth Edition, John Wiley & Sons, Inc., (1997), unless reference is made to the Previous IUPAC form denoted with Roman numerals (also appearing in the same), or unless otherwise noted. Other inorganic oxides that may be employed either alone or in combination with the silica, or alumina are magnesia, titania, zirconia, clays and the like. In one preferred embodiment, the particulate support material comprises, at least in part, and oxide of silicon, such as silica.

Silica particles having the desired particle size distribution can be produced by sieving commercially obtained or specifically produced silica having a broader particle size distribution. However, certain commercially available grades of silica also meet the specifications.

In a class of embodiments, initially, the silica support material should be dry, that is, free of absorbed water or moisture. Drying of the silica support material can be effected by heating or calcining at about 100° C. to about 1000° C., preferably at least about 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems. The calcined support material may then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternative embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all or most of the catalyst system reactants, i.e., the activator and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane as well as tetrahydrofuran (THF), aromatics, such as benzene, toluene, and ethylbenzene, may also be employed.

The catalyst employed in the present process generally comprises at least one metallocene compound or one or more metallocene catalysts. A metallocene generally refers to a compound containing one or more cyclopentadienyl (Cp) moieties in combination with a transition metal. The Cp ring(s) can be like or unlike, unsubstituted, substituted, or a derivative thereof, such as a heterocyclic ring system which may be substituted, and the substitutions can be fused to form other saturated or unsaturated rings systems, such as tetrahydroindenyl, indenyl, or fluorenyl ring systems, The active catalyst systems should include not only metallocene, but also an activator, such as an alumoxane or a derivative thereof (preferably, methylaluminoxane (MAO)), an ionizing activator, a non-coordinating anion, a Lewis acid, or a combination thereof. Preferably, the catalyst system includes a metallocene catalyst with single or multiple cyclopentadienyl components reacted with either a metal alkyl or alkoxy component or an ionic compound component. These catalysts can include partially and or fully activated precursor compositions. The catalysts may be modified by prepolymerization or encapsulation. Specific metallocenes and catalyst systems useful are disclosed in WO 96/11961 and WO 96/11960. Other non-limiting examples of metallocene catalysts and catalyst systems are discussed in U.S. Pat. Nos. 4,808,561, 5,017,714, 5,055,438, 5,064,802, 5,124,418, 5,153,157 and 5,324,800. Still other organometallic complexes and/or catalyst systems are described in Organometallics, 1999, 2046; WO 96/23010, WO 99/14250, WO 98/50392, WO 98/41529, WO 98/40420, WO 98/40374, WO 98/47933; and EP 0 881 233 A and EP O 890 581 A.

In several embodiments, the process of the present invention is typically conducted at a temperature from 30 to 120° C., preferably from 60 to 115° C., more preferably from 70 to 110° C., most preferably from 70 to 100° C., and a pressure from 790 to 3550 kPa-a, preferably from 2100 to 2500 kPa-a. For the production of polyethylene polymers having a density of at least 0.940 g/cc, such as 0.940 to 0.970 g/cc, an operating temperature of from about 90° C. to 100° C. is preferred, whereas to prepare products having a density of less than 0.940 g/cc, such as about 0.910 to <0.940 g/cc, a temperature of about 75° C. to 95° C. is preferred.

Referring now to FIG. 1, one example of a fluidized bed reaction system suitable for polymerizing ethylene and other alpha olefins including a reactor 10 comprising a reaction zone 12 and a velocity reduction zone 14.

The reaction zone 12 includes a bed of growing polymer particles, formed polymer particles and a minor amount of catalyst particles fluidized by the continuous flow of polymerizable and modifying gaseous components in the form of make-up feed and recycle gas passing through the reaction zone. To maintain a viable fluidized bed, the mass gas flow rate through the bed is normally maintained above the minimum flow required for fluidization, and preferably from about 1.5 to about 10 times $G_{mf}$ and more preferably from about 3 to about 6 times $G_{mf}$, where $G_{mf}$ is used in the accepted form as the abbreviation for the minimum gas flow required to achieve fluidization, see C. Y. Wen and Y. H. Yu, "Mechanics of Fluidization", Chemical Engineering Progress Symposium Series, Vol. 62, p. 100-111 (1966).

It is highly desirable that the fluidized bed always contains particles to prevent the formation of localized "hot spots" and to entrap and distribute the particulate catalyst throughout the reaction zone. On start-up, the reactor is usually charged with a base of particulate polymer particles before gas flow is initiated. Such particles may be identical in nature to the polymer to be formed or different therefrom. When different, they are withdrawn with the desired formed polymer articles as the first product. Eventually, a fluidized bed of the desired polymer particles replaces the start up bed.

Fluidization is achieved by a high rate of gas recycle to and through the bed, typically in the order of about 50 times the rate of feed of make up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor 10.

Make-up gas is fed to the bed at a rate equal to the rate at which particulate polymer product is withdrawn. The composition of the make-up gas is determined by a gas analyzer (not shown) positioned above the fluidized bed. The gas analyzer determines the composition of the gas being recycled and the composition of the make-up gas is adjusted accordingly to maintain an essentially steady state gaseous composition within the reaction zone.

The portion of the gas stream which does not react in the fluidized bed constitutes the recycle gas which is removed from the polymerization zone, preferably by passing it into velocity reduction zone 14 above the bed where entrained particles are given an opportunity to drop back in to the bed.

The recycle gas exits the velocity reduction zone 14 through line 16 and is then compressed in a compressor 18 before being passed through a heat exchanger 20 where it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed, thereby, maintaining itself at an essentially constant temperature under steady conditions. The compressor 18 can also be placed downstream of heat exchanger 20.

To insure complete fluidization, the recycle gas and, and where desired, part or all of the make-up gas, are returned to the reactor 10 at its base 22 below the fluidized bed. A gas distribution plate 24 positioned above the point of return ensures proper gas distribution and also supports the resin bed when gas flow is stopped.

The appropriate catalyst used in the fluidized bed, in this case a metallocene catalyst on a particulate silica support, is preferably stored for service in a reservoir 26 under a blanket of a gas which is inert to the stored material, such as nitrogen or argon. The catalyst is injected into the fluidized bed at a rate equal to its consumption at a point 28 which is above the distribution plate 24. A gas which is inert to the catalyst such as nitrogen or argon may used to carry the catalyst into the bed.

A gaseous feedstream comprising the ethylene monomer and any $C_3$ to $C_8$ alpha-olefin comonomer is introduced into the gas recycle stream and supplied to the reactor 10 at its base 22. Any gas inert to the catalyst and reactants can also be present in the gaseous feedstream.

The particulate polymer product is preferably withdrawn from the reactor 10 at a point 30 at or close to distribution plate 24.

In one embodiment, a fluidized bed reaction system such as that shown in FIG. 1 is used to polymerize ethylene and 1-hexene to produce a polyethylene product with a gradient density of at least 0.940 g/cc. In this case, it is found that, by using a metallocene catalyst supported on particulate silica with a $d_{10}$ particle size as measured by laser diffraction of at least 18 microns, the tendency for sheeting, particularly on the walls of the velocity reduction zone 14, is reduced as compared with a substantially similar or an identical process in which the metallocene catalyst is supported on particulate silica with a $d_{10}$ particle size as measured by laser diffraction of less than 18 microns.

In another embodiment, a fluidized bed reaction system such as that shown in FIG. 1 is used to polymerize ethylene and 1-hexene to produce a polyethylene product with a gradient density of less than 0.94 g/cc. In this case, it is found that by, using a metallocene catalyst supported on particulate silica with a $d_{10}$ particle size as measured by laser diffraction of at least 18 microns, the rate of fouling of the distributor plate 24 is reduced as compared with a substantially similar or an identical process operated at the same superficial gas velocity but in which the metallocene catalyst is supported on particulate silica with a $d_{10}$ particle size as measured by laser diffraction of less than 18 microns. Alternatively, by increasing the superficial gas velocity, the reactor cooling rate and the polymer production rate can be increased at a constant distributor plate fouling rate by using the metallocene catalyst supported on particulate silica with a $d_{10}$ particle size as measured by laser diffraction of at least 18 microns.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1 (Inventive)

A fluidized bed reaction system similar to that shown in FIG. 1 was used to polymerize ethylene and 1-hexene to produce two different polyethylene products A and B each with a gradient density of 0.920 g/cc, but with product A having a melt index of 1 g/10 min and product B having a melt index of 0.5 g/10 min as determined in accordance with ASTM D-1238 under a load of 2.16 kg and at a temperature of 190° C. In each case, the metallocene catalyst was supported on particulate silica supplied by PQ Corporation as ES-70X and having a $d_{10}$ particle size of 21.1 microns, a $d_{50}$ particle size of 50.9 microns, and a $d_{90}$ particle size of 93.7 microns. The particle size distributions of the resultant polymers are listed in Table 1.

Example 2 (Comparative)

The process of Example 1 was repeated but with the metallocene catalyst being supported on particulate silica supplied by PQ Corporation as ES-70 and having a $d_{10}$ particle size of 16.2 microns, a $d_{50}$ particle size of 41.4 microns and a $d_{90}$ particle size of 76.6 microns. Again, the particle size distributions of the resultant polymers are listed in Table 1.

TABLE 1

| Particle Size | Example 1 | | Example 2 | |
| --- | --- | --- | --- | --- |
| | Product A | Product B | Product A | Product B |
| d10 (μm) | 486 | 469 | 369 | 355 |
| d50 (μm) | 1024 | 952 | 804 | 735 |
| d90 (μm) | 2145 | 1941 | 1596 | 1511 |

The results in Table 1 show that, for each polymer product, the catalyst system of Example 1 produced polymer particles having higher $d_{10}$, $d_{50}$ and $d_{90}$ particle sizes than the catalyst of Example 2.

Example 3

Figure 2:
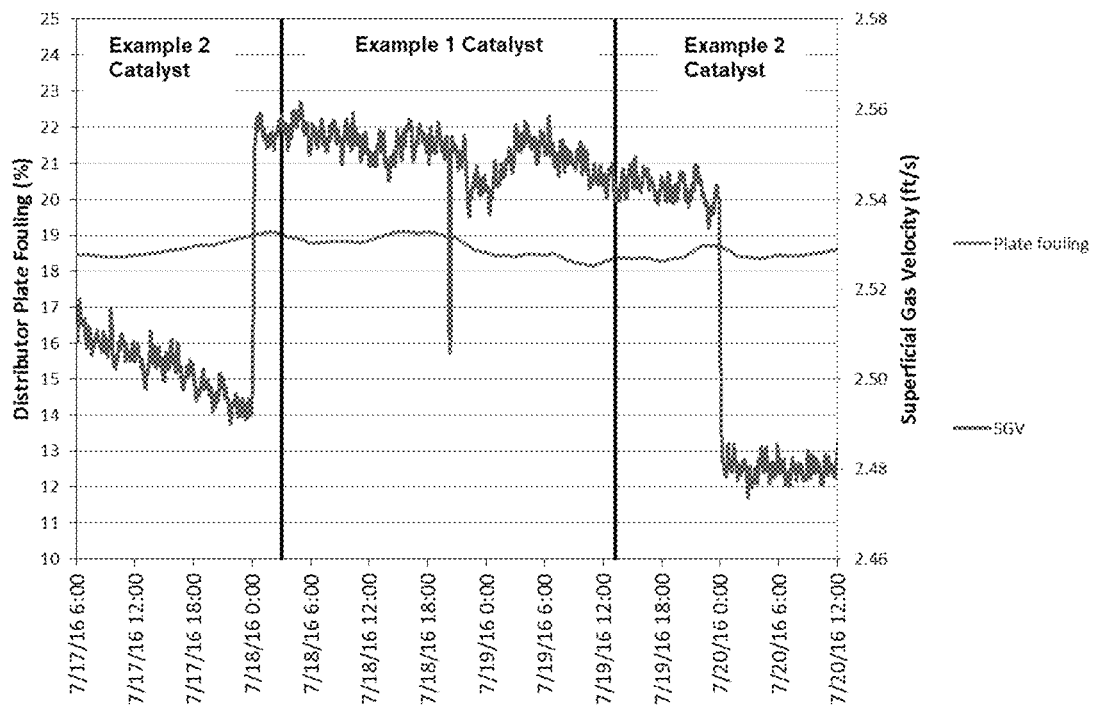
FIG. 2 is a graph showing changes in superficial gas velocities required to maintain substantially stable distributor plate fouling during the polymerization process of Example 3.

The processes of Examples 1 and 2 were repeated in a combined polymerization experiment to test whether increasing the $d_{10}$ particle size of catalyst support would enable the reaction to be conducted at higher superficial gas velocity (SGV) without increasing distributor plate fouling. For the first twenty one hours of the test, product A was produced using the catalyst supported on silica ES-70 (Example 2) with the SGV set at about 2.50 ft/sec and then, for the remaining fifty seven hours of the test, product B was produced, initially using the catalyst supported on silica ES-70X (Example 1) with the SGV increased to about 2.55 ft/sec and then, after thirty four hours, using the catalyst supported on silica ES-70 (Example 2) with the SGV decreased to about 2.48 ft/sec. The results are shown in FIG. 2 and show that the rate of distributor plate fouling remained substantially constant throughout the experiment despite the increased SGV used with the catalyst supported on silica ES-70X (Example 1).

Example 4 and Example 5

The processes of Examples 1 and 2 were again repeated to polymerize ethylene and 1-hexene to produce polyethylene product C with a gradient density of 0.935 g/cc and polyethylene product D with a gradient density of 0.940 g/cc. For each polyethylene product, three separate runs were conducted in which the product was initially produced using (1) the catalyst supported on silica ES-70 (Example 5), then (2) the catalyst supported on silica ES-70X (Example 4) and then finally (3) the catalyst supported on silica ES-70 again (Example 5). The reason for "bookending" each inventive test run with the control was to make sure any changes seen with the larger $d_{10}$ support were actual and were not due to process variability over time.

During each run, granules of polyethylene may accumulate on the internal surfaces of the fluidized bed reactor and grow together to form sheets, which eventually fall from the reactor surfaces. The sheets leave the reactor pass to a purging vessel where extra hydrocarbons are removed using $N_2$ gas. At the exit of the purge vessel is a vibrating screen which allows good granular product to pass through, but catches sheets and sends them to a waste bin called the "pan". Therefore, monitoring the amount and size of sheets collected in the pan is a good indication of how well the reactor is running, and how continuity performance changes when reactor conditions (or in this case, support types) change.

Figure 3:
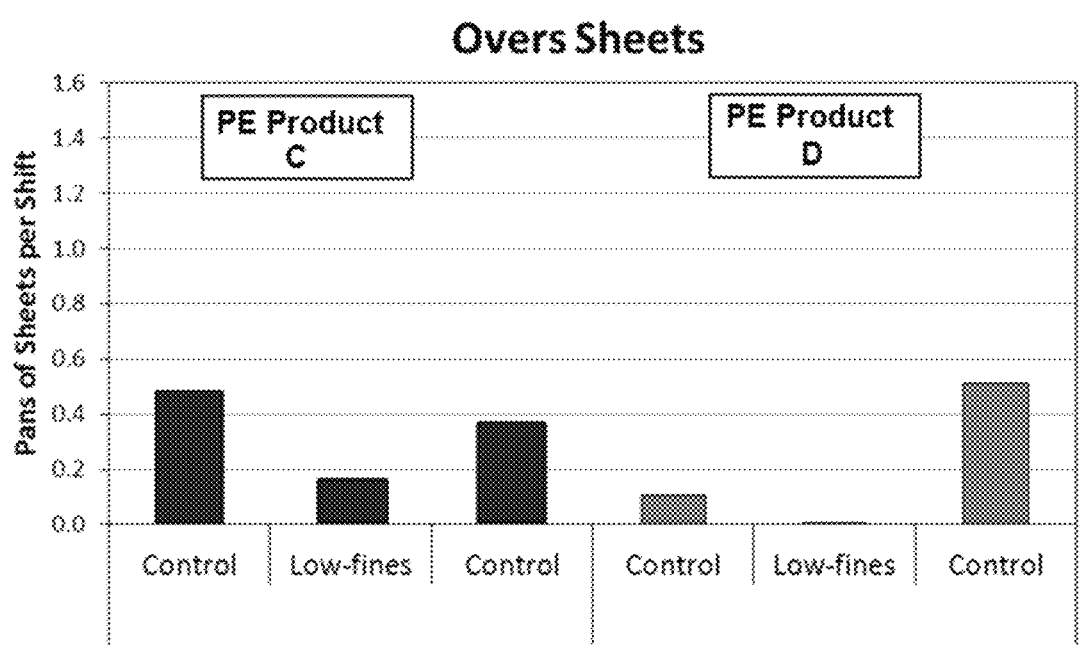
FIG. 3 is a bar graph comparing the number of pans of polyethylene sheets produced per twelve hour shift during the polymerization processes of Examples 4 and 5.

The results of the runs for each polymer grade are shown in FIG. 3 and show that for both grades the amount of sheeting was significantly less using the silica support of Example 4 as compared with that of Example 5.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A gas phase polymerization process for producing polyethylene polymers comprising contacting ethylene and at least one $C_3$ to $C_8$ alpha-olefin comonomer with a polymerization catalyst on a particulate support in a fluidized bed polymerization reactor comprising a distributor plate, a reaction zone, and a velocity reduction zone, under conditions effective to polymerize at least part of the ethylene and comonomer, producing and recovering the polyethylene polymers, wherein the fluidized bed comprises growing polymer particles, formed polymer particles, and catalyst particles;

wherein the fluidized bed is fluidized by a continuous flow of polymerizable and modifying gaseous components comprising make-up feed and recycle gas passing through the distributor plate and into the reaction zone at a superficial gas velocity, wherein the superficial gas velocity is sufficient to maintain the fluidized bed in the reaction zone;

and further wherein the particulate support comprises an inorganic oxide selected from silica, alumina, magnesia, titania, zirconia, clays, and combinations thereof, and further has a $d_{10}$ particle size as measured by laser diffraction of at least 18 microns, a $d_{50}$ particle size as measured by laser diffraction of at least 40 microns, and a $d_{90}$ particle size as measured by laser diffraction of no more than 100 microns.

2. The process of claim 1, wherein the particulate support comprises an oxide of silicon.

3. The process of claim 1, wherein the polymerization catalyst comprises one or more metallocene catalysts.

4. The process of claim 3, wherein the particulate support comprises an oxide of silicon.

5. The process of claim 1, wherein process comprises a rate of distributor plate fouling and the rate of distributor plate fouling is reduced as compared with a substantially similar or an identical process operating at the same superficial gas velocity and using the same polymerization catalyst but on a particulate support having a $d_{10}$ particle size as measured by laser diffraction of less than 18 microns.

6. The method of claim 4, wherein sheeting in the velocity reduction zone is reduced as compared to an otherwise substantially identical process in which the metallocene catalyst is supported on particulate silica with a $d_{10}$ particle size as measured by laser diffraction of less than 18 microns.

7. The process of claim 4, wherein fouling on the distributor plate is reduced as compared to an otherwise substantially identical process operated at the same superficial gas velocity, but in which the metallocene catalyst is supported on particulate silica with a $d_{10}$ particle size as measured by laser diffraction of less than 18 microns.

8. The process of claim 4, further comprising increasing the superficial as velocity of the gaseous components flowing through the distributor plate and through the reaction zone; and increasing rate of cooling of the reactor and rate of production of the polyethylene polymer at a constant distributor plate fouling rate.

9. The process of claim 1, wherein the process comprises a rate of sheeting and the rate of sheeting is reduced as compared with a substantially similar or an identical process using the same polymerization catalyst but on a particulate support having a $d_{10}$ particle size as measured by laser diffraction of less than 18 microns.

10. The process of claim 1, further comprising polymerizing at a temperature from 30 to 120° C. and a pressure from 790 to 3550 kPa-a.

11. The process of claim 1, wherein the comonomer comprises propylene, 1-butene, 1-hexene, 1-octene, or mixtures thereof.

12. The process of claim 1, wherein the polyethylene polymers have a density of at least 0.920 g/cc.

13. The process of claim 1, wherein the polyethylene polymers have a density less than 0.940 g/cc.

* * * * *